(12) United States Patent
Yoshihara et al.

(10) Patent No.: US 8,644,582 B2
(45) Date of Patent: Feb. 4, 2014

(54) SUPPORT SYSTEM FOR HISTOPATHOLOGICAL DIAGNOSIS, SUPPORT PROGRAM FOR HISTOPATHOLOGICAL DIAGNOSIS AND SUPPORT METHOD FOR HISTOPATHOLOGICAL DIAGNOSIS

(75) Inventors: Yoshiko Yoshihara, Tokyo (JP); Kenji Okajima, Tokyo (JP); Akira Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 259 days.

(21) Appl. No.: 13/119,678

(22) PCT Filed: Oct. 6, 2009

(86) PCT No.: PCT/JP2009/005178
§ 371 (c)(1),
(2), (4) Date: Mar. 17, 2011

(87) PCT Pub. No.: WO2010/041423
PCT Pub. Date: Apr. 15, 2010

(65) Prior Publication Data
US 2011/0170754 A1 Jul. 14, 2011

(30) Foreign Application Priority Data
Oct. 9, 2008 (JP) ................................. 2008-262663

(51) Int. Cl.
*G06K 9/00* (2006.01)
(52) U.S. Cl.
USPC ....................................................... 382/133

(58) Field of Classification Search
USPC ..................... 382/128, 129, 133; 377/10, 11; 250/461.2; 348/79, 80; 435/1.1, 40.5, 435/40.52
See application file for complete search history.

(56) References Cited

U.S. PATENT DOCUMENTS

| 5,991,028 | A | * | 11/1999 | Cabib et al. ................... 356/456 |
| 8,265,359 | B2 | * | 9/2012 | Andrushkiw et al. ......... 382/128 |
| 2004/0018546 | A1 | * | 1/2004 | Hung ................................. 435/6 |
| 2006/0127880 | A1 | * | 6/2006 | Harris et al. ....................... 435/4 |
| 2007/0012886 | A1 | * | 1/2007 | Tearney et al. ............. 250/459.1 |
| 2007/0177786 | A1 | * | 8/2007 | Bartels .......................... 382/133 |
| 2009/0262993 | A1 | * | 10/2009 | Kotsianti et al. .............. 382/128 |

FOREIGN PATENT DOCUMENTS

| JP | 2622725 B2 | 6/1997 |
| JP | 2001-059842 A | 3/2001 |
| JP | 2004-286666 A | 10/2004 |
| JP | 2005-352571 A | 12/2005 |
| JP | 2009-180539 A | 8/2009 |

OTHER PUBLICATIONS

Spyridonos et al ("Integration of Expert Knowledge and Image Analysis Techniques for Medical Diagnosis", A. Campilho and M. Kamel (Eds.): ICIAR 2006, LNCS 4142, pp. 110-121, 2006).*

(Continued)

*Primary Examiner* — Shervin Nakhjavan
(74) *Attorney, Agent, or Firm* — Sughrue Mion, PLLC

(57) ABSTRACT

A support system for histopathological diagnosis includes a cell nucleus uniformity evaluation unit evaluating a uniformity of a plurality of cell nuclei included in a ductal region in an image. With this configuration, there is provided a support system, a support method and a support program for histopathological diagnosis, which enables realization of highly accurate cancer differentiation in a pathological diagnosis.

45 Claims, 11 Drawing Sheets

(56) References Cited

OTHER PUBLICATIONS

Barshack et al ("Spectral morphometric characterization of breast carcinoma cells", British Journal of Cancer 79(9/10), 1613-1619, 1999).*

Spyridonos et al ("A computer-based diagnostic and prognostic system for assessing urinary bladder tumour grade and predicting cancer recurrence", Department of Medical Instrumentation Technology, Technological Educational Institution of Athens, vol. 27, No. 2 , pp. 111-122, 2002).*

Purcell et al ("Intraductal Proliferations of the Breast: A Review of Histologic Criteria for Atypical Intraductal Hyperplasia and Ductal Carcinoma in Situ, Including Apocrine and Papillary Lesions", Annals of Diagnostic pathology, vol. 2, No. 2, pp. 135-145, Apr. 1998).*

Ladekarl et al ("Prognostic, Quantitative Histopathologic Variables in Lobular Carcinoma of the Breast", University institute of pathology, university of Aarhus, Denmark, Jun. 7, 1993).*

Spyridonos et al ("Neural Network-Based Segmentation and Classification Sytem for Automated Grading of Histologic Sections of Bladder Carcinoma", Neural Networks in carcinoma, vol. 24, No. 6/ Dec. 2002).*

Office Action dated May 6, 2013 issued by The State Intellectual Property Office of the People's Republic of China in counterpart Chinese Application No. 200980140217.X.

Toshiyuki Tanaka, et al., "Discriminant Analysis for Severity Assessment of Tumor", Denki Gakkai Iyo Seitai Kogaku Kenkyukai Shiryo, Jan. 31, 2008, pp. 21-26, vol. MBE-08, Nos. 29-34, Abstract 2.

Tatsuya Ishido, et al., "Morphometrical Analysis of Nuclear Abnormality of Tubular Tumors of the Stomach with Image Processing", Japan J Cancer Res, 1992, pp. 294-299, vol. 83, No. 3.

Masao Yano, et al., "Gazo Kaiseki Sochi o Mochiita Nyugan Saibo Kakuikeido no Kyakkanteki H yoka to Seibutsugakuteki Akuseido tono Kankei", Journal of Japanese College of Surgeons, 1997, pp. 576-581, vol. 22, No. 4.

Fumiaki Tezuka, et al., "Quantitative Cytopathology of Endometrial Lesions", J Cell Biochem, 1995, pp. 147-150, No. Suppl 23.

Reiko Hayashi, "Seijo Narabini Syuyosei Shikyu Naimaku Shibo no Kaku Keisoku", Journal of the Japanese Society of Clinical Cytology, 1992, pp. 457-465, vol. 31, No. 3.

\* cited by examiner

FIG. 8
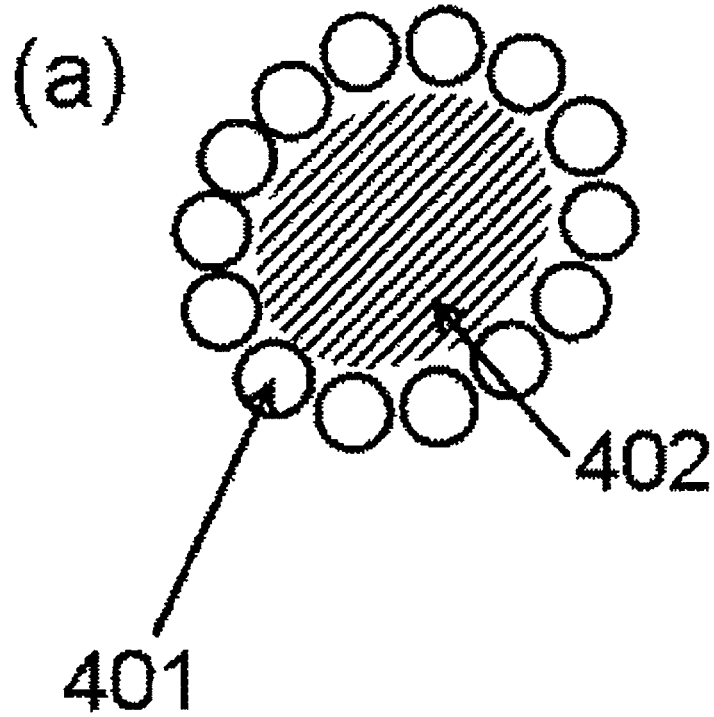
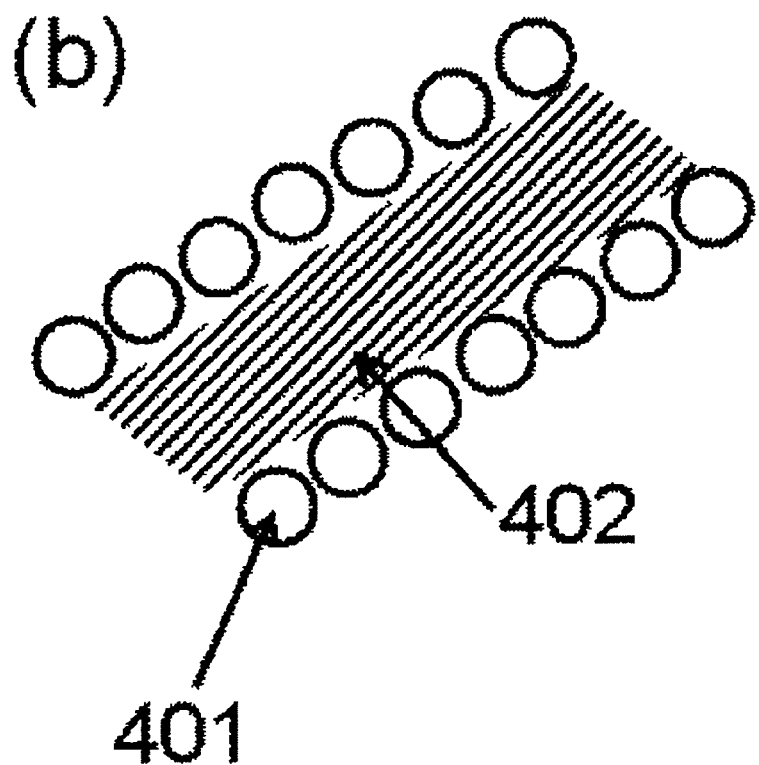

FIG. 10
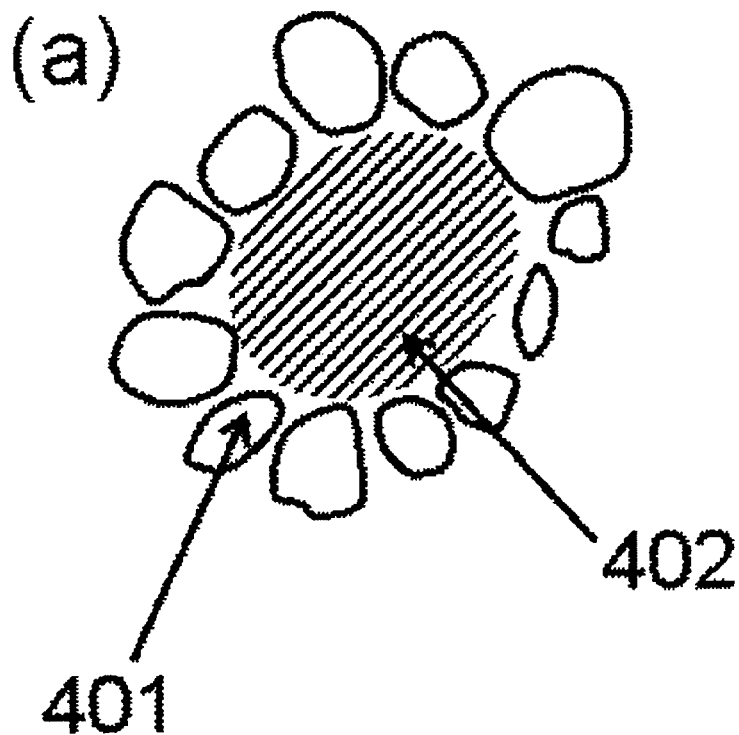
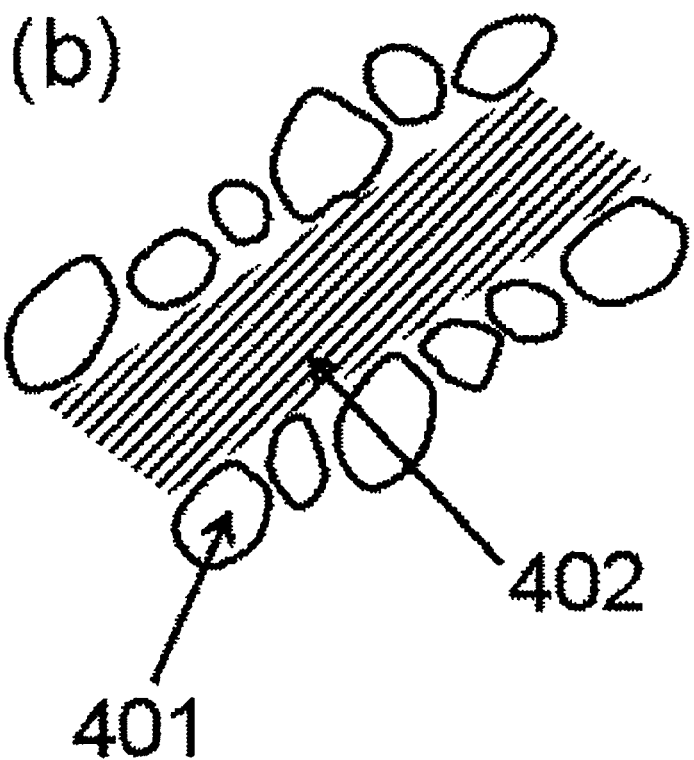

FIG. 11
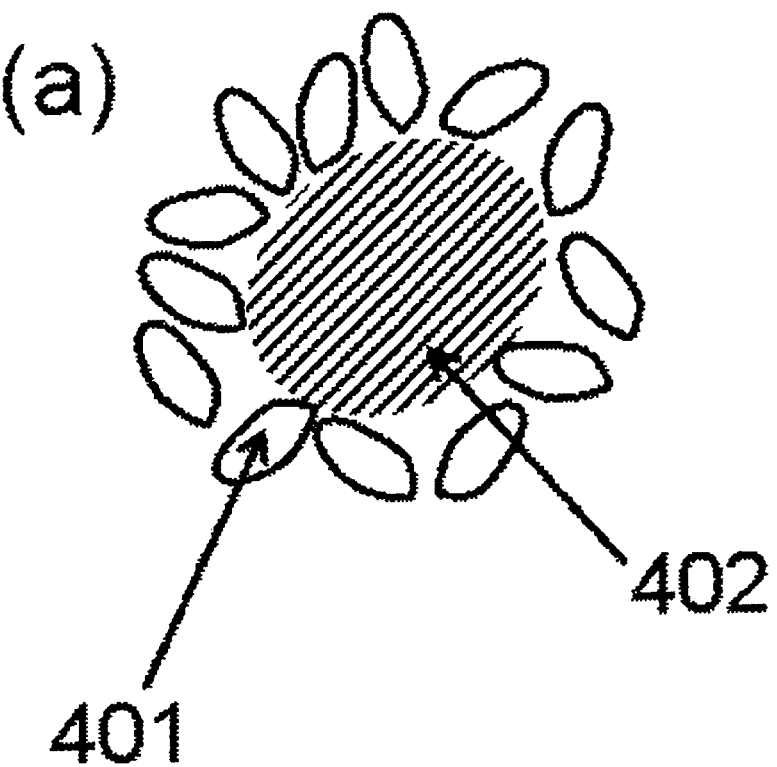
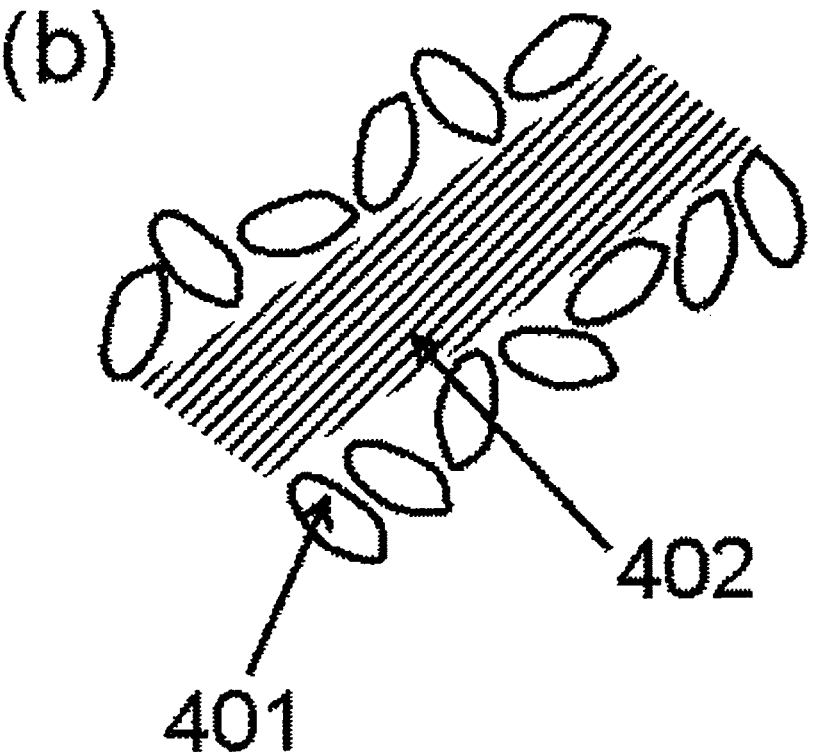

SUPPORT SYSTEM FOR HISTOPATHOLOGICAL DIAGNOSIS, SUPPORT PROGRAM FOR HISTOPATHOLOGICAL DIAGNOSIS AND SUPPORT METHOD FOR HISTOPATHOLOGICAL DIAGNOSIS

CROSS REFERENCE TO RELATED APPLICATIONS

This application is a National Stage of International Application No. PCT/JP2009/005178, filed on Oct. 6, 2009, which claims priority from Japanese Patent Application No. 2008-262663, filed on Oct. 9, 2008, the contents of all of which are incorporated herein by reference in their entirety.

TECHNICAL FIELD

The present invention relates to a support system for histopathological diagnosis, a support program for histopathological diagnosis, and a support method for histopathological diagnosis which analyze pathological images.

BACKGROUND ART

Histopathological diagnosis is very important because the result of the diagnosis is involved in determining the subsequent clinical course, for example. In histopathological diagnosis, a tissue collected from a lesion is prepared for a glass slide sample for a microscope, and a pathologist observes the sample and makes diagnosis regarding, for example, whether the lesion is benign or malignant, and the degree of advancement and malignancy. In the diagnosis, pathologists make decisions depending on their experiences in many cases.

In the related art, a pathologist observes the sample through a microscope to make the diagnosis in the pathological diagnosis. However, recently, a method in which the sample image is made into a digital image, and the image is observed through a personal computer or the like to make diagnosis has been put to practical use. This technique makes it possible for a pathologist to make diagnosis while changing magnification of the image and the diagnosis portion in the image through a large screen such as a personal computer, without using a microscope.

In addition, there is a support system for histopathological diagnosis which processes the digitalized pathological images with a computer and thereby enables characteristic useful in the diagnosis to be extracted. The pathologist's decision is the premise of the pathological diagnosis; however, as the image process technique and the optical system technique have advanced, a qualitative diagnosis can be made by using the support system for histopathological diagnosis.

In the histopathological diagnosis, the Hematoxylin-Eosin stain (HE stain) is a basic staining method. In the HE stain, the cell nucleus is stained bluish purple, and cytoplasm and stromal components are stained pale pink with good contrast such that the entire image of the tissue may be properly observed.

Through knowledge of the histopathological diagnosis, it is known that the NC ratio (which is equal to the area of nucleus in a cell/the area of cytoplasm in a cell) of a cancer cell increases remarkably compared to a normal cell. The NC ratio may be calculated by using an image showing hematoxylin distribution and an image showing eosin distribution.

Patent document 1 discloses a diagnosis support system detecting cancer sites from digital pathological image data. In the patent document 1, the distribution of the nucleus and the cytoplasm included in the digital pathological images is found quantitatively by using the NC ratio. Based on the information, the distribution of the cancer site and the degree of advance of cancer is determined.

[Patent Document 1] Japanese Unexamined Patent Application Publication No. 2004-286666

DISCLOSURE OF THE INVENTION

However, in the histopathological diagnosis using the NC ratio, just the area of the nucleus and the area of the cytoplasm included in a certain area in the image are comprehensively compared to each other, but each of the nuclei are not compared to each other.

Therefore, the characteristics of the cancer cell which may be guessed by the NC ratio are restricted to the enlargement of the nucleus, increase of the cytoplasm, and increase in the nuclear-cytoplasmic ratio, for example. For this reason, when a duct of the gland is pathologically diagnosed, the NC ratio is not sufficient as the information for the diagnosis.

Through knowledge of pathological diagnosis, it is known that, in the malignant cancer cells of the duct of the gland, the characteristics such as the size, form, and polarity of the nucleus of the cancer cells are not uniform. In other words, the uniformity of the nucleus decreases in the malignant cancer cells of the duct of the gland.

The uniformity herein refers, to what extent a certain characteristic is uniform over all of the nuclei when the characteristic of the nucleus is compared in a plurality of nuclei. Accordingly, the uniformity is not represented by using only a single nucleus.

For instance, when a characteristic, the size of the nucleus, is considered, if each of a plurality of nuclei has the same size, it may be stated that the uniformity of the nuclei is high with regard to size. Inversely, if each of the nuclei has a completely different size, it may be stated that the uniformity of the nuclei is low with regard to size.

It is very difficult to evaluate the characteristic non-uniformity of the nuclei which is observed in the malignant cancer cells in the duct of the gland by using the NC ratio. For example, even though the nucleus of the malignant cancer cell is enlarged, if the cell itself is also enlarged along with the nucleomegaly, the NC ratio of the malignant cancer cell remains the same as the NC ratio of the normal cell. Also, the form and the polarity of the nucleus may not be evaluated with the NC ratio.

When differentiation is made as to whether the duct of the gland has a malignant cancer or a benign tumor in the pathological diagnosis of the duct of the gland, it is preferable to use the characteristics of the individual nuclei included in the duct of the gland. Particularly, in the pathological diagnosis of the duct of the gland, it is preferable to evaluate, for example, the size uniformity, the form uniformity, and the polarity disturbance of the plurality of nuclei included in the duct of the gland.

In the pathological diagnosis of the duct of the gland, it is important to evaluate the uniformity of a plurality of cell nuclei constituting the duct of the gland; however, there is no system and method which can realize such evaluation. Therefore, the method used in the related art does not observe and evaluate the points to note for differentiating the adenocarcinoma, so the accuracy of determination was insufficient.

The object of the invention is to provide a support system, a support program, and a support method for histopathological diagnosis, which evaluate the uniformity of a plurality of cell nuclei included in the duct of a gland, in order to resolve the above problems.

A first support system for the histopathological diagnosis of the invention is a system supporting the histopathological diagnosis by analyzing images of body tissues, the system including an input unit inputting images, and a cell nuclei uniformity evaluation unit evaluating the uniformity of a plurality of cell nuclei included in a ductal region in the input images.

A second support system for the histopathological diagnosis of the invention is a system supporting the histopathological diagnosis by analyzing images of body tissues, the system including an input unit inputting images, an analysis unit analyzing the input images, and an output unit outputting the uniformity of a plurality of cell nuclei included in the ductal region in the analyzed images.

A first support program for the histopathological diagnosis of the invention is a computer program supporting the histopathological diagnosis by analyzing images of body tissues, the program causing a computer device to perform an input process inputting images and a cell nuclei uniformity evaluation process generating the uniformity of a plurality of cell nuclei included in the ductal region in the input images.

A second support program for the histopathological diagnosis of the invention is a computer program supporting the histopathological diagnosis by analyzing images of body tissues, the program causing a computer device to perform an input process inputting images, an analysis process analyzing the input images, and an output process outputting the uniformity of a plurality of cell nuclei included in the ductal region in the analyzed images.

A first support method for the histopathological diagnosis of the invention is a method supporting the histopathological diagnosis by analyzing images of body tissues, the method including inputting images, and evaluating cell nuclei uniformity by generating the uniformity of a plurality of cell nuclei included in the ductal region in the input images.

A second support method for the histopathological diagnosis of the invention is a method supporting the histopathological diagnosis by analyzing images of body tissues, the method including inputting images, analyzing the input images, and outputting the uniformity of a plurality of cell nuclei included in the ductal region in the analyzed images.

Various constituent components of the invention may be so formed in order that they realize their functions, for example, by a dedicated hardware functioning in a predetermined way, a computer device provided with a predetermined function by a computer program, a predetermined function realized in a computer device by a computer program, and an arbitrary combination thereof.

Various constituent components of the invention are not necessarily components which are independent from each other. For example, a plurality of constituent components may be formed into one member, a single constituent component may be formed of a plurality of members, a constituent component may be a part of another constituent component, and a part of a constituent component may be overlapped with a part of another constituent component.

Although the support program and the support method for histopathological diagnosis of the invention disclose a plurality of processes and operations in an order, the order of the plurality of processes and operations is not limited to the order of the disclosure.

Therefore, when the support program and the support method for histopathological diagnosis of the invention are performed, it is possible to change the order of the plurality of processes and operations within a range that does not interfere with the content.

Each of the plurality of processes and operations of the support program and the support method for histopathological diagnosis of the invention is not limited to being performed at different timings. Therefore, for example, while a process and an operation are performed, another process and operation may be performed, or, the timing when a process and an operation are performed may be overlapped partially or entirely with the timing when the other process and operation are performed.

According to the invention, it is possible to improve the accuracy in differentiating cancer in the pathological diagnosis by evaluating the uniformity of a plurality of cell nuclei included in the duct of the gland.

BRIEF DESCRIPTION OF THE DRAWINGS

The above described object, other objects, characteristics, and advantages become clearer by the preferable embodiments described later and the accompanying drawings below.

FIG. 8 is a schematic view illustrating the form of a normal duct of the gland.

FIG. 10 is a schematic view illustrating the form of a duct of the gland in which the form of cell nuclei is not uniform (the uniformity is low).

FIG. 11 is a schematic view illustrating the form of a duct of the gland in which the polarity of cell nucleus is not uniform (the uniformity is low).

BEST MODE FOR CARRYING OUT THE INVENTION

Figure 1:
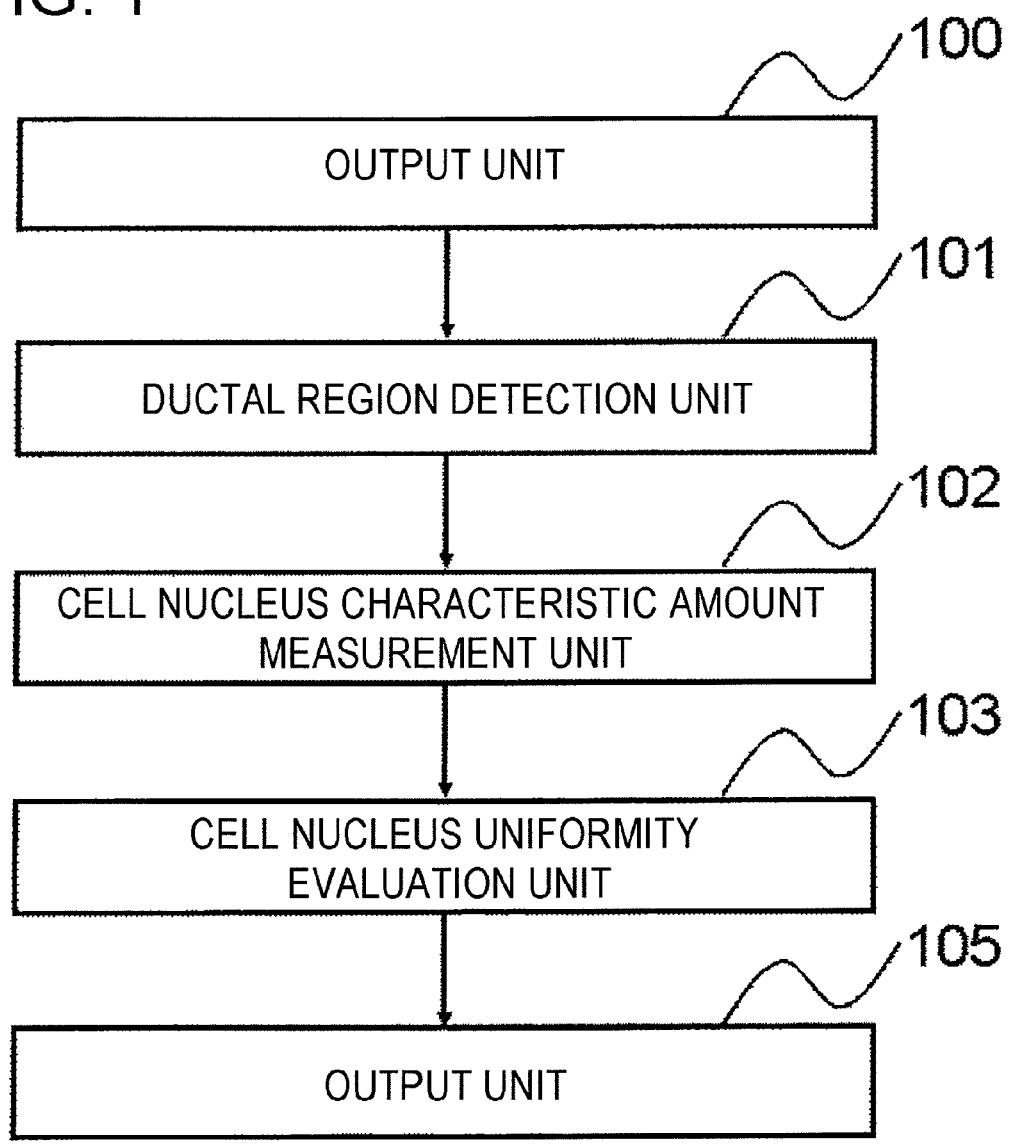
FIG. 1 is a block diagram illustrating the configuration of a support system for histopathological diagnosis of the invention.

Hereinbelow, the embodiment of the invention will be described in detail with reference to the drawings. Regarding the description of the drawings, the identical components are denoted by the same symbol and the description of the component will not be repeated.

The invention is not necessarily limited to the following embodiments, and may be embodied with various modifications within the technical scope of the invention.

First Embodiment

In the first embodiment, a support system for histopathological diagnosis according to the invention, the system including an input unit 100 inputting biological images to the system, a ductal region detection unit 101 detecting a ductal region included in the biological images, a cell nucleus characteristic amount measurement unit 102 measuring the characteristic amount of a plurality of nuclei in the ductal region, a cell nucleus uniformity evaluation unit 103 evaluating the uniformity of the plurality of nuclei in the ductal region by using the characteristic amount, and an output unit 105 outputting a result, is described.

FIG. 1 is a block diagram illustrating a support system for histopathological diagnosis according to the first embodiment of the invention. The input unit 100 inputs digitalized biological image data to the system.

The ductal region detection unit 101 detects the ductal region included in the biological image input from the input unit 100. The cell nucleus characteristic amount measurement unit 102 measures the characteristic amount of the plurality of nuclei in the ductal region for every single nucleus.

The characteristic amount of the nucleus is found by using the characteristics of the nucleus. The examples of the characteristics of the nucleus include the size, form, and polarity of the nucleus; however, any characteristic may be included in the examples without limitation as long as it can be used for the differentiation of cancers. In the embodiment, the size of the nucleus is used.

The cell nucleus uniformity evaluation unit 103 evaluates the uniformity of the nucleus in the ductal region by using the characteristic amount of the nuclei. A plurality of nuclei is included in the ductal region. The characteristic amounts of the nuclei included in the ductal region are compared to one another. When the uniformity of the nuclei is high, the duct of the gland may be determined to be normal or have a benign tumor, and when the uniformity is low, the duct of the gland can be determined to have a malignant cancer.

The output unit outputs the result of the system. The result herein is a result obtained by an arbitrary unit of the system, or a result obtained by all of the units.

Next, the effect of the embodiment will be described. The embodiment of the invention is configured so that the ductal region included in the biological image is detected, the sizes of the plurality of cell nuclei in the ductal region are measured, and the uniformity of the cell nuclei is quantitatively analyzed per duct of the gland by using the size of the cell nuclei, in order to allow evaluation. Therefore, it is possible to evaluate the uniformity of the cell nuclei of the plurality of the cell nuclei in the duct of the gland, and to improve the accuracy of the differentiation of cancer in the pathological diagnosis.

Particularly, the invention is favorably used for differentiation of the well-differentiated adenocarcinoma and benign tubular adenoma in group 3. The cancer cell includes a well-differentiated cell and a poorly differentiated cell, and the cancer cell differentiated to a high degree is called a well-differentiated carcinoma.

The group 3 in the pathological diagnosis of cancer refers to a tumor corresponding to the boundary region between a benign tumor and a malignant tumor. In the well-differentiated adenocarcinoma and benign tubular adenoma in group 3, the more severe the malignancy of cancer, the more markedly the size, form, polarity or the like of the cell nuclei constituting the duct of the gland tend to lose uniformity. Therefore, evaluating the characteristics of individual nuclei in the duct of the gland makes it possible to differentiate the adenocarcinoma and the tubular adenoma.

Figure 2:
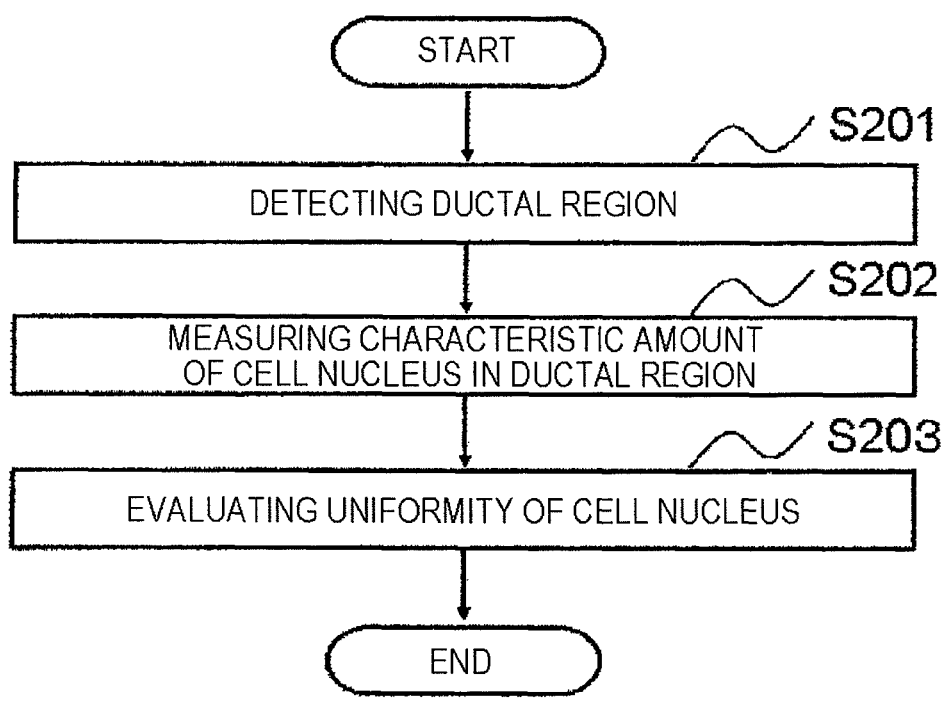
FIG. 2 is a flowchart illustrating the operation of a support system for histopathological diagnosis of the invention.

Now the operation of the support system for histopathological diagnosis according to the first embodiment will be described. FIG. 2 shows a flowchart for illustrating an example of the operation of the first embodiment, and FIG. 8 schematically shows the general configuration of the duct of the gland.

Figure 9:
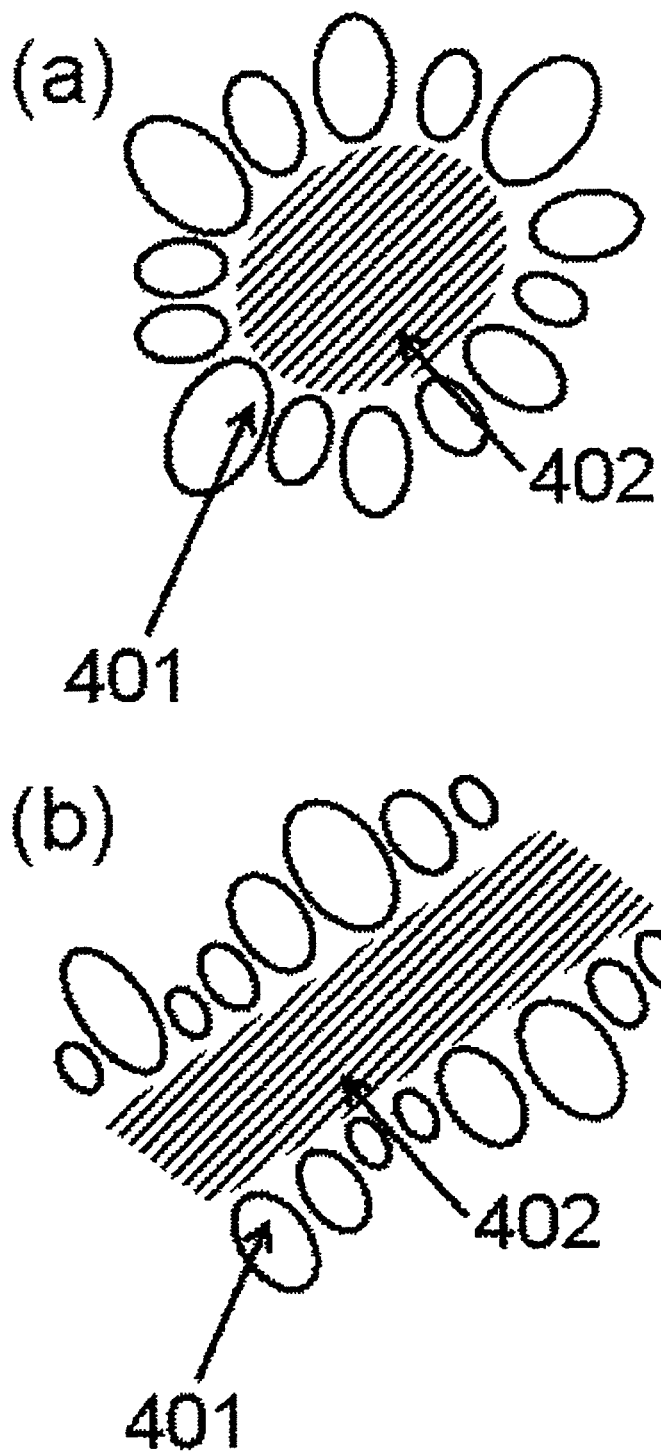
FIG. 9 is a schematic view illustrating the form of a duct of the gland in which the size of cell nucleus is not uniform (the uniformity is low).

FIG. 8(*a*) shows the configuration of the duct of the gland in which a cell nucleus 401 surrounds a lumen 402, and FIG. 8(*b*) shows the configuration of the duct of the gland in which the lumen 402 is interposed between the cell nuclei 401. FIG. 9 schematically shows the configuration of the duct of the gland in which the size of the cell nucleus is not uniform.

In the configuration of duct of the gland in FIG. 9(*a*), the size of the cell nucleus 401 surrounding the lumen 402 is not uniform. In the configuration of duct of the gland in FIG. 9(*b*), the size of the cell nuclei 401 between which the lumen 402 is interposed is not uniform.

The support system for histopathological diagnosis according to the first embodiment evaluates the uniformity of the plurality of the cell nuclei included in the configuration of the duct of the gland by using the size of the cell nucleus. As shown in FIG. 8, in the general configuration of the duct of the gland, the size of cell nucleus is uniform.

However, as shown in FIG. 9, when the duct of the gland has a malignant cancer, the size of the cell nucleus is highly likely to be non-uniform. The support system for histopathological diagnosis according to the embodiment evaluates this characteristic.

In the support system for histopathological diagnosis according to the embodiment, first, the ductal region detection unit 101 detects the ductal region from the biological image (step S201). Generally, as shown in FIG. 8, the duct of the gland has the configuration in which the lumen is surrounded by cell nuclei.

In the embodiment, the cell nuclei and the lumen are detected from the biological image, and the ductal region is detected by using the detected lumen and the cell nuclei surrounding the lumen. An example of the operation of extracting the ductal region from the biological image such as histopathological image data will be described below with reference to FIG. 3.

The histopathological image data of the specification refers to a image of the body tissue in which the nucleus and the cytoplasm are stained; however, the data is not limited thereto and may be any image in which the nucleus area and the cytoplasm area can be distinguished.

In the embodiment, the histopathological image data is an image of the body tissue in which the nucleus and the cytoplasm are stained with different colors. In more detail, the histopathological images represents the image of the body tissue in which the cell nucleus is stained bluish purple with hematoxylin and the cytoplasm is stained pink with eosin.

Figure 3:
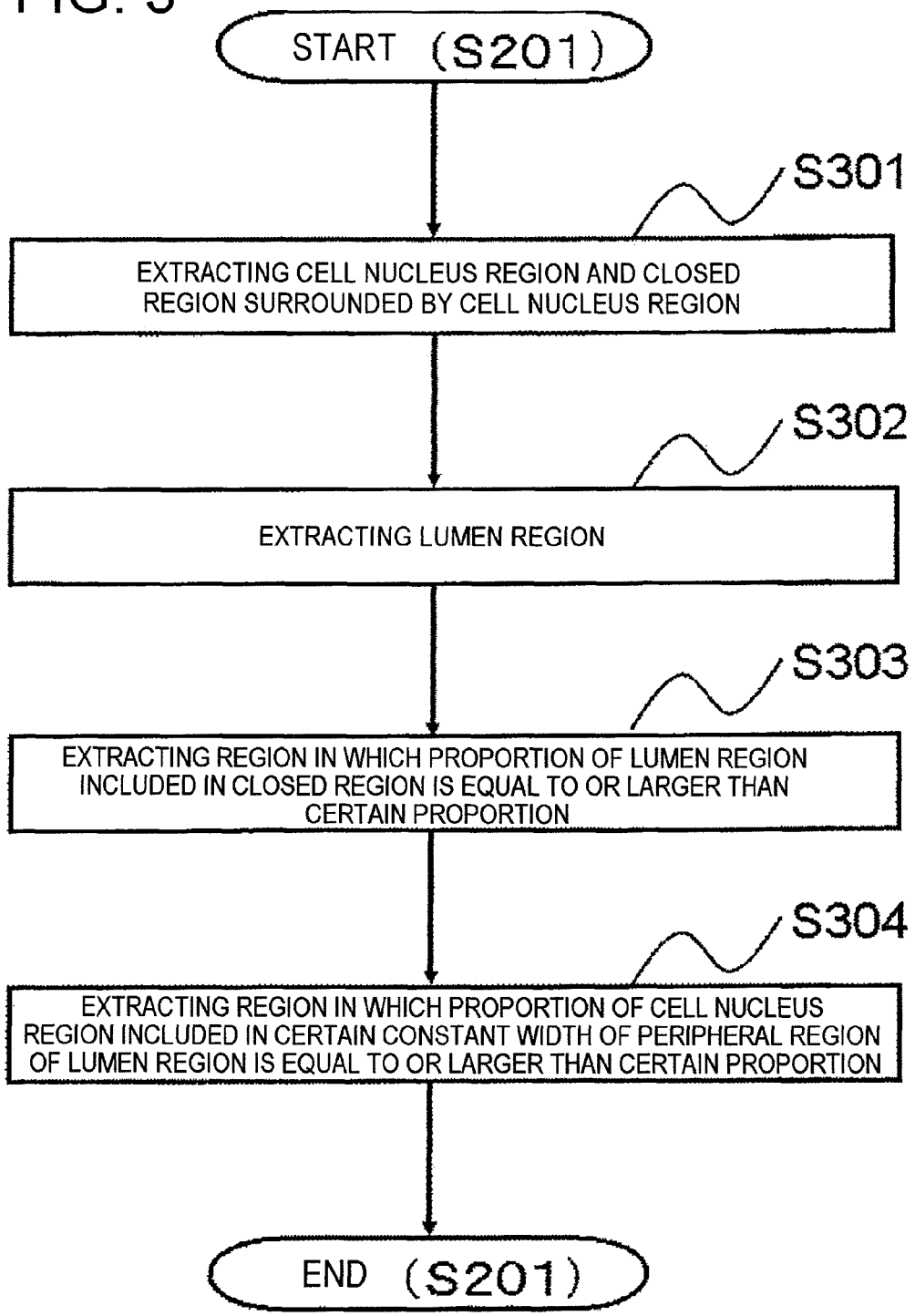
FIG. 3 is a flowchart illustrating the operation for detecting a ductal region.

First, the ductal region detection unit 101 extracts a cell nucleus region and a closed region surrounded by the cell nucleus region from the biological image. The ductal region detection unit 101 performs a color processing on respective pixels in the image, and detects pixels stained bluish purple with hematoxylin. The ductal region detection unit 101 also extracts the region surrounded by the cell nucleus region as a closed region (FIG. 3, step S301).

Subsequently, the ductal region detection unit 101 detects a lumen region. Since the lumen is not stained with hematoxylin and eosin, the color of the lumen in the image data is close to white.

Now the ductal region detection unit 101 performs the color processing on respective pixels in the image, detects pixels which are not stained with hematoxylin and eosin and are close to white, and extracts the detected pixels as the lumen region (step S302).

The ductal region detection unit 101 then calculates the proportion of the lumen region in the closed region. If the proportion of the lumen region in the closed region is equal to or larger than a certain threshold, the closed region and the cell nucleus region surrounding the closed region are detected as a candidate for the ductal region (step S303).

The ductal region detection unit 101 performs the following operation on the candidate for the ductal region extracted in step S303, and detects the ductal region. The region (a peripheral region) surrounding the periphery of the lumen region extracted in step S302 is extracted to a certain constant width, and the proportion of the cell nucleus region in the peripheral region is calculated.

If the proportion of the cell nucleus region in the peripheral region is equal to or larger than a certain threshold, the cell nucleus region and the lumen region surrounded by the cell nucleus region are detected as the ductal region (step S304).

The threshold and the constant width used in the above description may be calculated in advance by using the image data of the duct of the gland. The threshold can be calculated by using, for example, a learning algorithm or discriminant analysis.

As a preprocess detecting the closed region surrounded by the cell nucleus region, a blur filtering or an expanding process may be performed on the cell nucleus region extracted in step S301 by using a low-power image. Using the low-power image makes it possible to blur the profile of the nucleus included in the ductal region and to easily detect nuclei adjacent to each other. The use of the blur filter can also yield the same effect.

In the process order, any one of step S301 and step S302 may be performed first; also, any one of step S303 and step S304 may be performed first in the process order.

The ductal region may be detected by performing only one of step S303 or step S304. Detecting the ductal region by using a plurality of indices makes it possible to extract the ductal region with higher accuracy.

In the color processing performed in steps S301 and S302 for extracting bluish purple, pixels within the color range of a predetermined RGB value are detected as the color of the cell nucleus; however, the method of color processing is not limited thereto, and it does not matter if the HSV value or the CMY value is used. The method of extracting the cell nucleus region stained bluish purple is not limited to the above method.

Next, the cell nucleus characteristic amount measurement unit 102 measures the characteristic amount of the cell nucleus constituting the duct of the gland in the ductal region detected by the ductal region detection unit 101 (step S202). As the characteristic amount of the cell nucleus, the size of the cell nucleus is used.

First, the individual cell nucleus is extracted from the ductal region extracted in step S201. Subsequently, the value yielded by stressing the brightness value in the region of the extracted individual cell nucleus is calculated, and the thus calculated value is compared to a certain threshold. When the value is not more than the threshold, it is set as a value inside the nucleus region (which is equal to 1), and when the value is larger than the threshold, it is set as a value outside the nucleus region (which is equal to 0).

Thereafter, the binary image is subjected to Gauss filtering, and the threshold process is performed again.

By these processes, the image data becomes a binary image having two types of values including the value inside the nucleus region (which is equal to 1) and the value outside the nucleus region (which is equal to 0), and a connected component in the cell nucleus region (which is 1) is detected as one cell nucleus. The area of the cell nucleus as the connected component is calculated as the size of the cell nucleus.

Next, the cell nucleus uniformity evaluation unit 103 evaluates the uniformity of the cell nucleus per duct of the gland, by using the characteristic amount of the cell nucleus measured by the cell nucleus characteristic amount measurement unit 102 (step S203).

Figure 4:
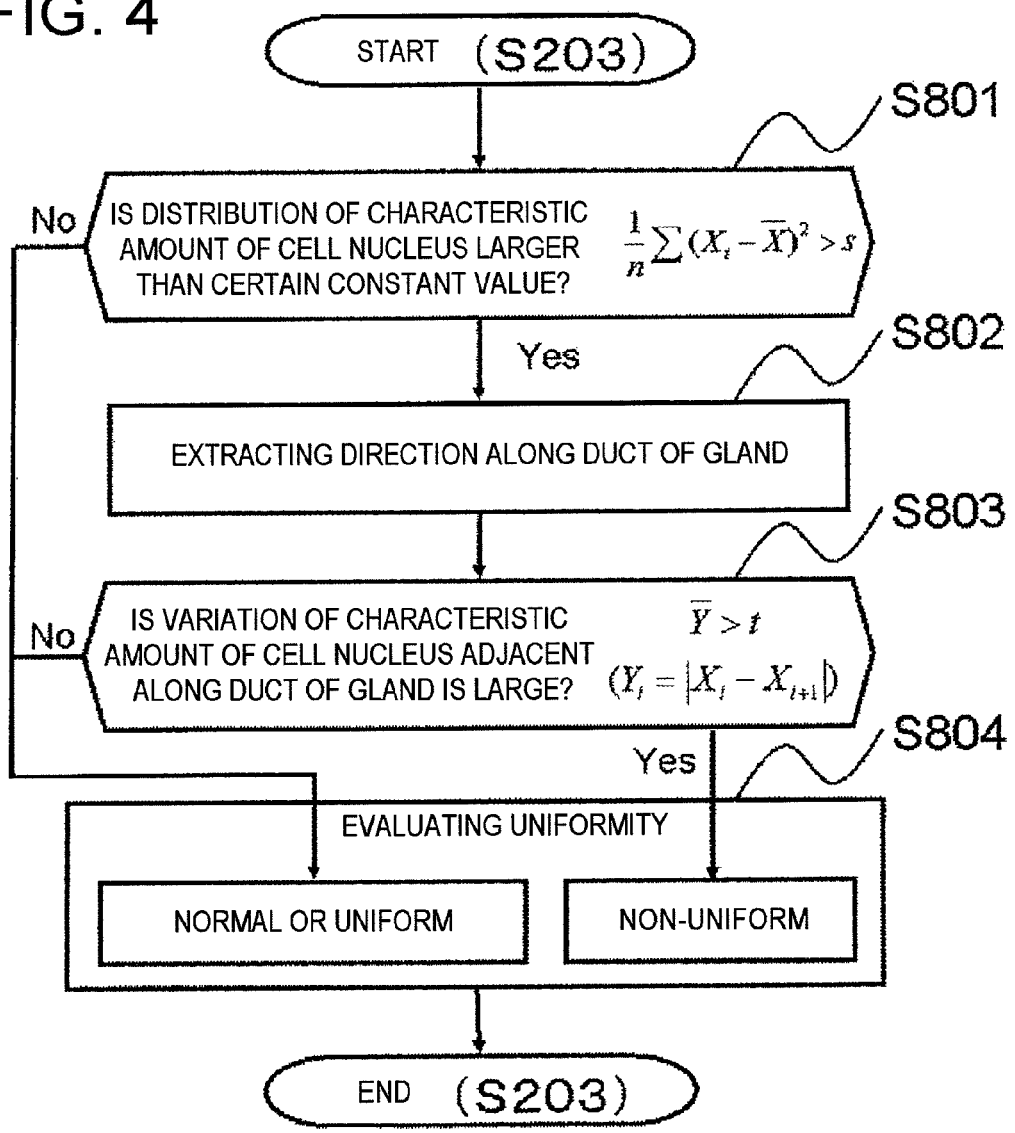
FIG. 4 is a flowchart illustrating the operation for evaluating the uniformity of cell nucleus.

To evaluate the uniformity of the cell nucleus, the size of the cell nucleus is used. Hereinbelow, a series of operations in which the uniformity of a plurality of cell nuclei included in a ductal region is evaluated by using the size of the cell nucleus is described with reference to FIG. 4.

First, the uniformity of the cell nucleus is evaluated by using the size distribution of the cell nucleus (step S801). The distribution of the cell nucleus is found by using a plurality of cell nuclei in the ductal region.

The size distribution of the cell nucleus in one duct of the gland is calculated by using information on the size of the cell nucleus measured in step S202. When the distribution is not larger than a certain threshold, a value showing uniformity (for example "0") is set as a determination variable, and the process moves onto step S804. When the distribution is larger than the threshold, the process moves on to step S802.

Next, the amount of variation in the size of cell nuclei adjacent to each other is used to evaluate the uniformity of the cell nucleus. First, the cell nucleus region constituting one duct of the gland is formed into a fine line, and the direction along the duct of the gland is extracted (step S802).

Subsequently, the size of a arbitrary cell nucleus is compared to that of a cell nucleus adjacent to the arbitrary cell nucleus in a direction along the duct of the gland, and the size variation between the two cell nuclei is calculated. As a result, when the variation is small, a value showing uniformity (for example "0") is set as a determination variable, and the process moves on to step S804.

On the other hand, when the variation is large, a value showing non-uniformity (for example "1") is set as a determination variable, and the process moves on to step S804 (step S803). The direction along the duct of the gland refers to a direction extending from an arbitrary cell nucleus A constituting the duct of the gland to a cell nucleus B adjacent to the cell nucleus A.

For instance, in FIG. 8(a), the direction along the duct of the gland varies with the respective cell nuclei. On the other hand, in FIG. 8(b), the direction along the duct of the gland is almost constant for the respective cell nuclei.

It is possible to extract the direction along the duct of the gland by making the cell nucleus region constituting one duct of the gland into a fine line. In order to make the cell nucleus region into the fine line, the edge of the lumen may be expanded to a certain constant width, for example. When the hematoxylin/eosin stain is used, while the lumen and the cell nucleus are stained, the cytoplasm is not stained. Therefore, the fine line may be created by using this information.

Provided that the size of a certain cell nucleus is denoted as $X_i$ and that the size of an adjacent cell nucleus is denoted as $X_{i+1}$, the degree of size variation of the adjacent cell nucleus in the direction along the duct of the gland can be calculated from the average $Y_{ave}$ of the absolute value of difference $Y_i = |X_i - X_{i+1}|$. Since the $Y_{ave}$ increases when the variation is large, it is possible to evaluate the uniformity by comparing the $Y_{ave}$ to a certain threshold t.

Finally, according to the determination variable received from step S801 or step S803, the uniformity of the plurality of cell nuclei in the duct of the gland is evaluated (step S804). The cell nucleus uniformity evaluation unit 103 can examine the uniformity of cell nuclei in the ductal region with respect to the all ductal regions by performing the operation in S203 on each of all ductal regions detected by the ductal region detection unit 101.

Various thresholds used in the embodiment are calculated in advance by using the image data of the duct of the gland in which the malignancy or benignness of cancer is already known. It is possible to calculate the threshold by using a learning algorithm or discriminant analysis, for example.

The method of detecting the ductal region according to the invention is not limited to the above method and other methods may be used. The method of measuring the size of the cell nucleus according to the invention is not limited to the above method. The size of the cell nucleus may be measured by other methods.

The evaluation of the uniformity of the cell nucleus in the ductal region according to the invention is not limited to the above method. Both the distribution and the amount of variation may be taken as the condition of the determination index, or, the evaluation may be made under the condition that either of the distribution or the amount in variation is satisfied.

When the characteristic of the cell nucleus is measured, a high-power image may be used. Using the high-power image makes it possible to accurately recognize the profile of the cell nucleus. Therefore, it is possible to accurately measure the characteristic of the cell nucleus.

In the embodiment, although the cell nucleus region is formed into the fine line to extract the direction along the duct of the gland, the blur filtering or expanding process may be performed on the cell nucleus region as the preprocess.

The support system for histopathological diagnosis according to the invention may include the input unit 100 in FIG. 1, and the output unit 105 outputting the uniformity of a plurality of cell nuclei included in the ductal region in the image. The characteristic of the cell nucleus used for measuring the characteristic amount of the cell nucleus is not limited to the size, but may be the form or the polarity for example.

When the ductal region in the image can be specified, for example, since the ductal region included in the image of the body tissue is already known, the support system for histopathological diagnosis according to the invention may not include the ductal region detection unit. For instance, when the image of the body tissue is the image of a single ductal region, it is not necessary to extract the ductal region from the image.

As described so far, in the support system for histopathological diagnosis according to the invention, the ductal region is extracted from the histopathological image, and the uniformity of a plurality of cell nuclei in the ductal region is evaluated by using the size of the cell nucleus. Comparing the cell nuclei constituting the ductal region to each other makes it possible to differentiate between a malignant cancer and a benign tumor with higher accuracy compared to the case where the NC ratio is used. Accordingly, it is possible for a pathologist to make a more accurate diagnosis by using quantitative information on the sizes of a plurality of cell nuclei in the ductal region.

Second Embodiment

In the second embodiment, a process in which the form of the nucleus in the ductal region is measured, and the uniformity of the cell nucleus having various forms is quantitatively analyzed and evaluated per duct of the gland is described. Since the second embodiment is an application of the first embodiment, the description of the same points as in the first embodiment will not be repeated.

Different points between the second embodiment and the first embodiment will be described by using FIGS. 1 and 10. FIG. 1 shows the support system for histopathological diagnosis according to the invention. FIG. 10 is a view schematically showing the form of a duct of the gland where the form of the cell nucleus is not uniform.

In the support system for histopathological diagnosis according to the second embodiment, the cell nucleus characteristic amount measurement unit 102 measures the form of the cell nucleus as the characteristic amount of the cell nucleus. The cell nucleus uniformity evaluation unit 103 evaluates the uniformity of the cell nucleus having various forms measured by the cell nucleus characteristic amount measurement unit 102 per duct of the gland.

In this manner, by measuring the form of cell nucleus in the ductal region as the characteristic amount of the cell nucleus and evaluating the uniformity of the cell nucleus per duct of the gland by using the characteristic amount, it is possible to more accurately make the histopathological diagnosis.

The characteristic amount of the form of the cell nucleus can be measured by measuring the degree of circularity (which is equal to $(4\pi*\text{area})/(\text{circumference}*\text{circumference})$), and the flatness (which is equal to $(\text{major axis}-\text{minor axis})/\text{major axis}$) or the eccentricity (which is equal to the distance between foci/major axis) which is obtained when the cell nucleus is approximated to an ellipse.

The uniformity of the form of the cell nucleus can be evaluated by using the value of the distribution of the characteristic shown by the form of the cell nucleus, or, by using the amount of variation obtained between the characteristic amount shown by the form of an arbitrary cell nucleus and the characteristic amount shown by the form of a cell nucleus adjacent to the arbitrary cell nucleus.

For example, the value of the distribution of the cell nuclei in one ductal region is measured by using the characteristic amount representing the form of the cell nucleus, and when the distribution is large, it is determined that the form of cell nucleus is not uniform. Also, the forms of the cell nuclei adjacent to each other are compared to calculate the amount of variation in the same manner as in the first embodiment, and when the amount of variation varies remarkably, it is determined that the cell nuclei are not uniform.

The threshold used for evaluating the uniformity of a plurality of cell nuclei in the ductal region is calculated in advance by using the image data of the duct of the gland in which the malignancy or benignness of cancer is already known. The threshold can be calculated by using, for example, a learning algorithm or discriminant analysis.

The method of measuring the characteristic amount representing the form of the cell nucleus according to the invention is not limited to the above method. The form of the cell nucleus may also be measured by using other methods.

As described so far, the support system for histopathological diagnosis according to the embodiment measures the characteristic amount representing the form of the cell nucleus in the ductal region, and quantitatively evaluates the uniformity of the cell nuclei per duct of the gland by using the characteristic amount.

Comparing the cell nuclei constituting the ductal region to each other makes it possible to differentiate between a malignant cancer and a benign tumor with higher accuracy compared to the case where the NC ratio is used. Accordingly, it is possible for the pathologist to make a more accurate diagnosis by using quantitative information on the uniformity of the form of the cell nuclei.

Third Embodiment

In the third embodiment, a process in which the polarity of the cell nucleus in the ductal region is measured, and the uniformity of the cell nuclei having various polarities is quantitatively analyzed per duct of the gland for evaluation will be described. Since the embodiment is an application of the first and second embodiments, the description of the same points as in the first and the second embodiment will not be repeated.

The polarity of the cell nucleus herein represents the position, size, form, and the orientation of the cell nucleus. In normal tissue, the nuclei are arranged in the same position close to the basal membrane. However, in the cancer cell, the nuclei are arranged in different positions such as the upper side or the lower side of the basal membrane, and the size is also inconsistent. These indices represent the polarity disturbance of the nucleus in the specification.

Figure 5:
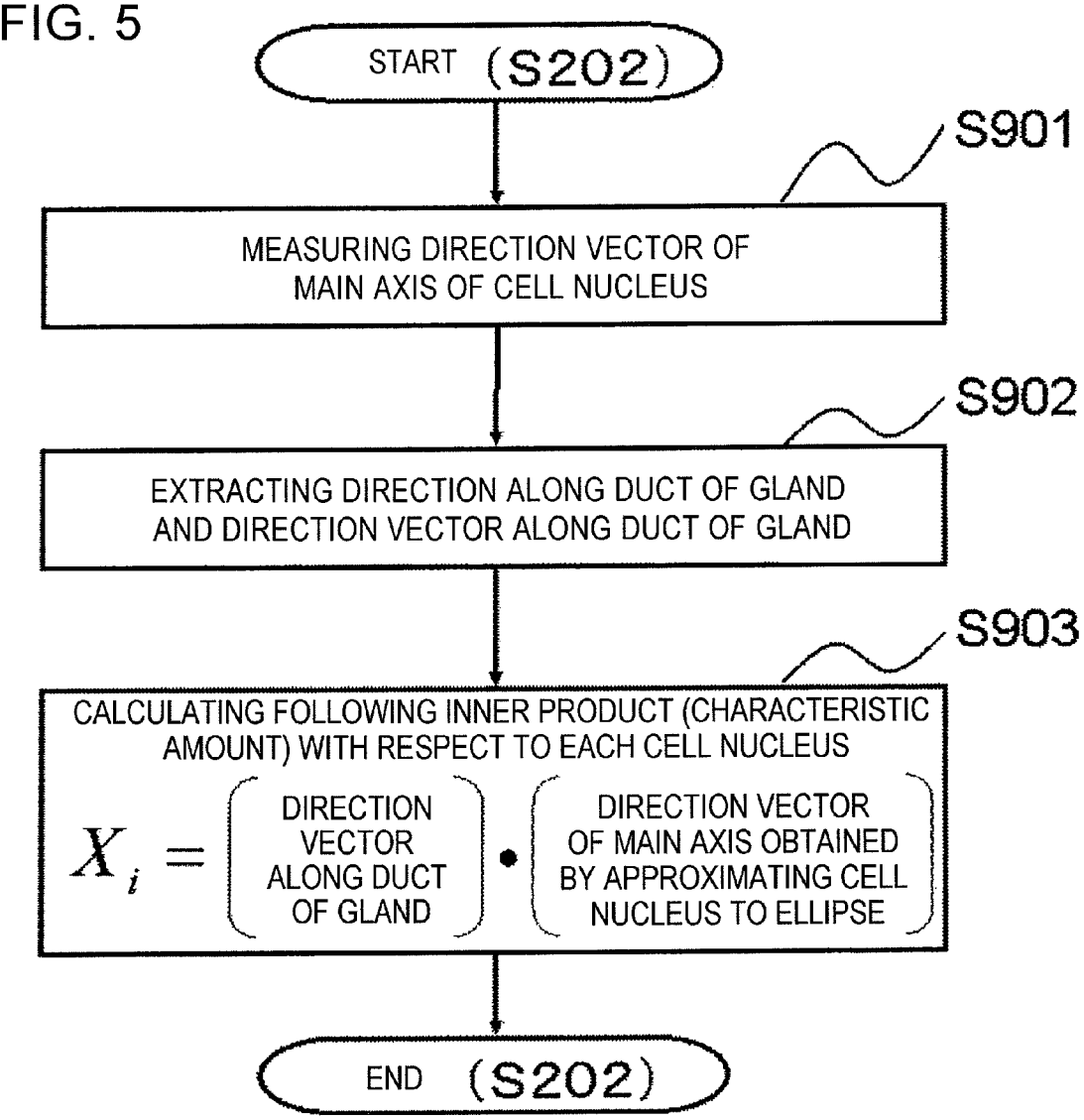
FIG. 5 is a flowchart illustrating the operation for measuring the polarity of cell nucleus.

The different points between the third embodiment and the first and second embodiments will be described by using FIGS. 1, 5, and 11. FIG. 1 shows the support system for histopathological diagnosis according to the invention. FIG. 5 shows the operation measuring the polarity of the cell nucleus. FIG. 11 is a view schematically showing the form of the duct of the gland where the polarity of the cell nucleus is disturbed.

In the support system for histopathological diagnosis according to the third embodiment, the cell nucleus characteristic amount measurement unit 102 measures the characteristic amount shown by the polarity of the cell nucleus. Also, the cell nucleus uniformity evaluation unit 103 evaluates the uniformity of the cell nucleus having various polarities, by using the characteristic amount measured by the cell nuclei characteristic amount measurement unit 102.

In this manner, by measuring the characteristic amount representing the polarity of the cell nucleus and evaluating the uniformity of the cell nucleus per duct of the gland by using the characteristic amount, it is possible to make a histopathological diagnosis with higher accuracy.

The operation in which the cell nucleus characteristic amount measurement unit 102 measures the polarity of the cell nucleus will be described with reference to FIG. 5. First, the cell nucleus characteristic amount measurement unit 102 calculates a direction vector of the main axis of the cell nucleus by approximating the cell nucleus to an ellipse (step S901)

Next, the cell nucleus characteristic amount measurement unit 102 forms the cell nucleus region constituting the duct of the gland into a fine line, and extracts the direction along the duct of the gland and the direction vector along the duct of the gland (step S902).

Thereafter, the cell nucleus characteristic amount measurement unit 102 calculates the inner product of the direction vector of the main axis of the cell nucleus and the direction vector along the duct of the gland (step S903). This inner product becomes the characteristic amount of the polarity of the cell nucleus. Provided that the direction vector along the duct of the gland is denoted by a, and the direction vector of the main axis obtained when the cell nucleus is approximated to an ellipse is denoted by b, the characteristic amount $X_i$ of the cell nucleus can be measured from $X_i = a \cdot b$.

The uniformity of the cell nuclei can be evaluated by using the value of the distribution of the characteristic amount representing the polarity of the cell nucleus constituting the duct of the gland, or the amount in variation between the characteristic amount representing the polarity of an arbitrary cell nucleus and the characteristic amount representing the polarity of the cell nucleus adjacent to the arbitrary cell nucleus.

For instance, the value of the distribution of the cell nucleus in one duct of the gland is measured by using the characteristic amount representing the polarities of the cell nuclei, and when the distribution is large, it is determined that the cell nucleus is not uniform. Alternatively, the amount of variation is calculated by comparing the adjacent cell nuclei to each other in terms of the polarity in the same manner as in the first embodiment, and when the amount of variation varies remarkably, it is determined that the cell nucleus is not uniform.

The method of measuring the polarity of the cell nucleus according to the invention is not limited to the above method. The polarity of the cell nucleus may be measured by other methods. The threshold used for evaluating the uniformity of the cell nucleus is calculated in advance by using the image data of the duct of the gland in which the malignancy or the benignness of cancer is already known. The threshold can be calculated by using, for example, a learning algorithm or discriminant analysis.

As described so far, the support system for histopathological diagnosis according to the embodiment measures the characteristic amount representing the polarity of the nucleus in the ductal region, and quantitatively analyzes the uniformity of the cell nucleus by using the characteristic amount, for evaluation.

By evaluating the cell nuclei constituting the ductal region with each other, it is possible to differentiate between a malignant cancer and a benign tumor with higher accuracy compared to a case where the NC ratio is used. In the embodiment, it is possible to evaluate the polarity disturbance of the cell nucleus per duct of the gland. Accordingly, it is possible for the pathologist to diagnose cancer with high accuracy by the quantitative information on the polarity disturbance of the cell nucleus in the duct of the gland.

Fourth Embodiment

In the fourth embodiment, a process in which a plurality of characteristic amounts is used for evaluating the uniformity of the characteristic of the cell nucleus in the ductal region will be described. Since the embodiment is an application of the first to the third embodiments, the description of the same points as in the first to the third embodiments will not be repeated.

The points of the fourth embodiment which are different from those of the first to third embodiments will be described with reference to FIG. 1. FIG. 1 shows the support system for histopathological diagnosis according to the invention. In the fourth embodiment, the cell nucleus characteristic amount measurement unit 102 measures two or more of the characteristic amounts of the cell nucleus.

As the characteristic amounts of the cell nucleus, for example, any two of the size, form, and polarity of the nucleus may be measured, or, all three may be measured. A characteristic amount other than these may also be measured.

In the fourth embodiment, the cell nucleus uniformity evaluation unit 103 comprehensively evaluates the uniformity of the cell nucleus by using a plurality of characteristic amounts measured by the cell nuclei characteristic amount measurement unit 102. As described in the first to third embodiments, it may be determined that the cell nucleus is not uniform only when all of the characteristic amounts including the size, form, and the polarity are determined to be non-uniform through the evaluation of the cell nucleus uniformity.

Alternatively, it may be determined that the cell nucleus is not uniform when any one of the characteristic amounts is determined to be non-uniform through the evaluation. Also, when the plurality of characteristic amounts is combined into one index, and the value of the index exceeds a certain threshold, it may be determined that the cell nucleus is not uniform.

The threshold used for evaluating the uniformity of the cell nucleus is calculated in advance by using the image data of the duct of the gland in which the malignancy or the benignness of cancer is already known. The threshold can be calculated by using, for example, a learning algorithm or discriminant analysis.

As described so far, in the support system for histopathological diagnosis according to the embodiment, a plurality of characteristic amounts of the cell nucleus is used for evaluating the uniformity of the cell nucleus in the ductal region. By using a plurality of characteristic amounts, it is possible for a pathologist to diagnose cancer with higher accuracy compared to a case where the single characteristic amount is used.

Fifth Embodiment

In the fifth embodiment, a process in which the uniformity of the cell nucleus is evaluated per duct of the gland, and then differentiation between a malignant cancer and a benign tumor is made based on the evaluation result will be described. Since the embodiment is an application of the first to fourth embodiments, the description of the same points as in the first to fourth embodiments will not be repeated.

Figure 6:
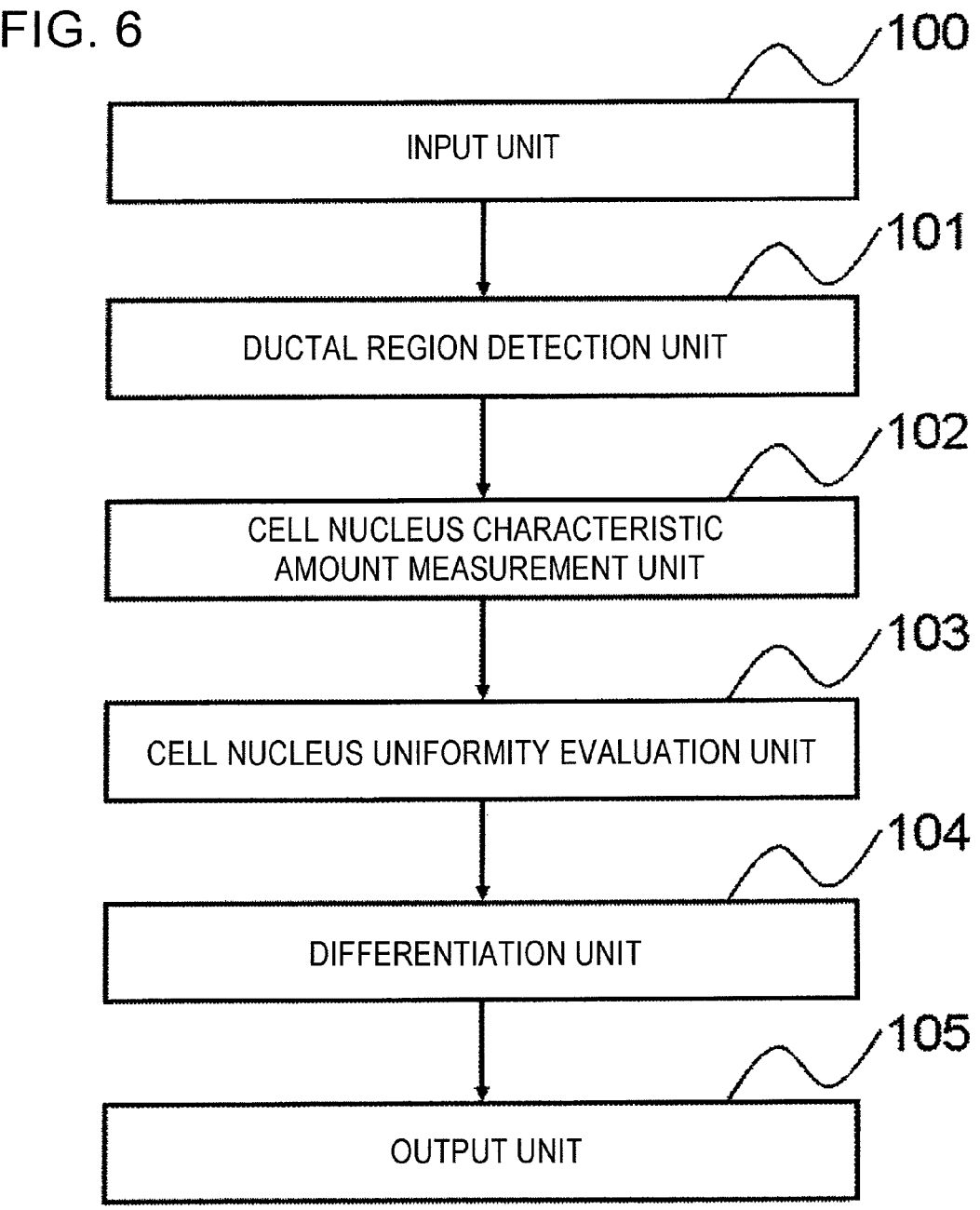
FIG. 6 is a block diagram illustrating the configuration of a support system for histopathological diagnosis according to the fifth embodiment.
Figure 7:
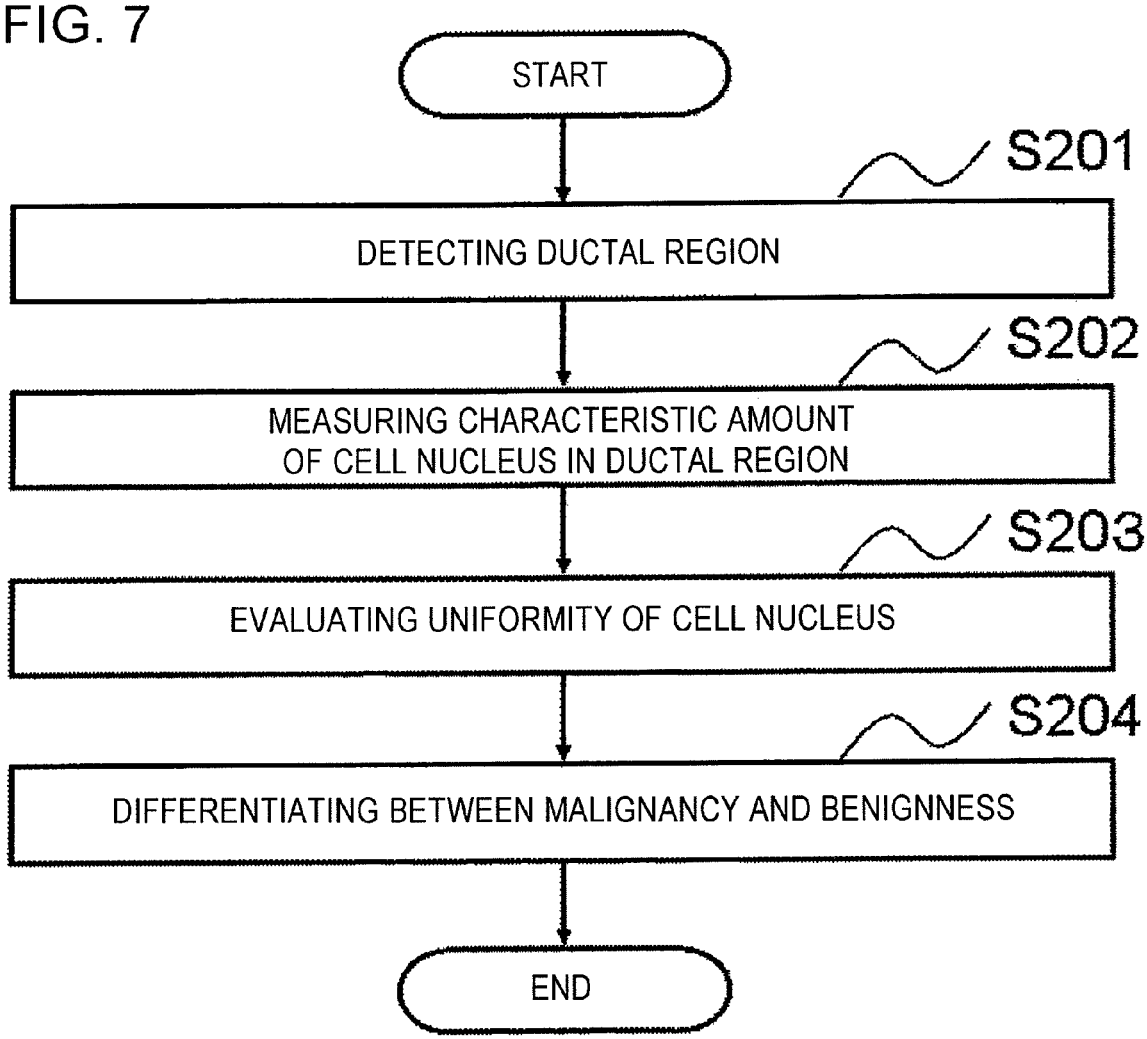
FIG. 7 is a flowchart illustrating the operation of a support system for histopathological diagnosis according to the fifth embodiment.

The points of the fifth embodiment which are different from those of the first to fourth embodiments will be described with reference to FIGS. 6 and 7. FIG. 6 shows a support system for histopathological diagnosis according to the fifth embodiment. FIG. 7 shows the operation of the support system for histopathological diagnosis according to the fifth embodiment.

In the support system for histopathological diagnosis according to the fifth embodiment, the uniformity of the cell nucleus in the ductal region is evaluated, in the same manner as in the support system for histopathological diagnosis according to the first to fourth embodiments (steps S201 to S203). Thereafter, a differentiation unit 104 differentiates between a malignant cancer and a benign tumor based on the evaluation result of the uniformity (step S204).

By providing a unit performing differentiation based on the evaluation result of the uniformity, it is possible to collectively perform a series of operations from the input of the pathological image data to the differentiation of cancer in a pathological diagnosis.

The support system for histopathological diagnosis according to the embodiment may differentiate between malignant cancer and a benign tumor by using the result of the evaluation of the uniformity of cell nuclei in ductal region and other data. By adding other factors in addition to the uniformity, it is possible to determine whether the cancer is malignant or benign with further improved accuracy.

For instance, as the information used for determining the malignancy or the benignness of cancer, the data showing the enlargement of cells can be used. The data showing the enlargement of cells can be obtained in the following manner. First, the ductal region is detected, and then the average value of the size of the cell nucleus constituting the duct of the gland is calculated.

When the average value is not more than a certain threshold, it is determined that the size of the cell nucleus in the duct of the gland is normal. On the other hand, when the average value is larger than the threshold, it is determined that the size of the cell nucleus in the duct of the gland is abnormal.

When the size of the cell nuclei is abnormal, it is considered that the cells in the duct of the gland have enlarged. Therefore, when the size of the cell nucleus is abnormal, it is possible to determine that the ductal region is a candidate for malignant cancer.

The threshold described above is calculated in advance by using the image data of the duct of the gland in which the malignancy or benignness of cancer is already known. The threshold can be calculated by using, for example, a learning algorithm or discriminant analysis.

As described so far, the support system for histopathological diagnosis according to the embodiment evaluates the uniformity of the cell nucleus in the ductal region, and then differentiates between a malignant cancer and a benign tumor based on the evaluation result.

In this manner, it is possible to collectively perform a series of operations from the input of the pathological image data to the differentiation of cancer in the pathological diagnosis. The pathologist can diagnose cancer with high accuracy by making the diagnosis based on the differentiation result.

This application claims its priority based on the Japanese Patent Application No. 2008-262663, filed Oct. 9, 2008, and entire disclosure thereof is incorporated herein by reference.

The invention claimed is:

1. A support system for histopathological diagnosis supporting histopathological diagnosis by analyzing an image of a body tissue, the system comprising:
   an input unit inputting said image, and
   a cell nucleus uniformity evaluation unit evaluating the uniformity of a plurality of cell nuclei included in a ductal region in said input image per duct.

2. The support system for histopathological diagnosis as set forth in claim 1,
   wherein said uniformity of said plurality of cell nuclei is found by using a characteristic amount of each cell nucleus included in said plurality of cell nuclei.

3. The support system for histopathological diagnosis as set forth in claim 2,
   wherein said characteristic amount of said cell nucleus is found by using the size of said cell nucleus.

4. The support system for histopathological diagnosis as set forth in claim 2,
   wherein said characteristic amount of said cell nucleus is found by using the form of said cell nucleus.

5. The support system for histopathological diagnosis as set forth in claim 2,
   wherein said characteristic amount of said cell nucleus is found by using the polarity of said cell nucleus.

6. The support system for histopathological diagnosis as set forth in claim 2,
   wherein said characteristic amount of said cell nucleus is found by using two or more of the size, form, and polarity of said cell nucleus.

7. The support system for histopathological diagnosis as set forth in a claim 2,
   wherein said uniformity of said plurality of cell nuclei is found by using the distribution of said characteristic amount of said cell nucleus in said plurality of cell nuclei included in said ductal region.

8. The support system for histopathological diagnosis as set forth in claim 2,
   wherein said uniformity of said plurality of cell nuclei is found by using an amount of variation in a characteristic amount between a cell nucleus selected arbitrarily from said plurality of cell nuclei and a cell nucleus adjacent to the arbitrarily selected cell nucleus.

9. The support system for histopathological diagnosis as set forth in claim 1,
   wherein said support system for histopathological diagnosis includes a differentiation unit differentiating whether said ductal region is malignant or benign, based on a measurement result of said uniformity of said plurality of cell nuclei.

10. The support system for histopathological diagnosis as set forth in claim 2,
wherein said support system for histopathological diagnosis includes a cell nucleus characteristic amount measurement unit measuring said characteristic amount of said cell nucleus.

11. The support system for histopathological diagnosis as set forth in claim 1,
wherein said support system for histopathological diagnosis includes a ductal region detection unit detecting said ductal region from said image.

12. The support system for histopathological diagnosis as set forth in claim 1,
wherein said ductal region detection unit detects a cell nucleus region from said image, and said ductal region based on said cell nucleus region.

13. A support system for histopathological diagnosis supporting histopathological diagnosis by analyzing an image of a body tissue, the system comprising:
an input unit inputting said image;
an analysis unit analyzing said input image; and
an output unit outputting a uniformity of a plurality of cell nuclei included in a ductal region in said analyzed image per duct.

14. The support system for histopathological diagnosis as set forth in claim 13,
wherein said output unit outputs whether said ductal region is malignant or benign.

15. A non-transitory information storage medium storing a support program for histopathological diagnosis which is a computer program supporting histopathological diagnosis by analyzing an image of a body tissue,
wherein the program causes a computer device to perform:
inputting said image; and
generating a uniformity of a plurality of cell nuclei included in a ductal region in said input image per duct.

16. The non-transitory information storage medium storing the support program for histopathological diagnosis as set forth in claim 15,
wherein said uniformity of said plurality of cell nuclei is found by using a characteristic amount of each cell nucleus included in said plurality of cell nuclei.

17. The non-transitory information storage medium storing the support program for histopathological diagnosis as set forth in claim 16,
wherein said characteristic amount of said cell nucleus is found by using the size of said cell nucleus.

18. The non-transitory information storage medium storing the support program for histopathological diagnosis as set forth in claim 16,
wherein said characteristic amount of said cell nucleus is found by using the form of said cell nucleus.

19. The non-transitory information storage medium storing the support program for histopathological diagnosis as set forth in claim 16,
wherein said characteristic amount of said cell nucleus is found by using the polarity of said cell nucleus.

20. The non-transitory information storage medium storing the support program for histopathological diagnosis as set forth in claim 16,
wherein said characteristic amount of said cell nucleus is found by using two or more of the size, form, and polarity of said cell nucleus.

21. The non-transitory information storage medium storing the support program for histopathological diagnosis as set forth in claim 16,
wherein said uniformity of said plurality of cell nuclei is found by using the distribution of said characteristic amount of said cell nucleus in said plurality of cell nuclei included in said ductal region.

22. The non-transitory information storage medium storing the support program for histopathological diagnosis as set forth in claim 16,
wherein said uniformity of said plurality of cell nuclei is found by using an amount of variation in a characteristic amount between a cell nucleus selected arbitrarily from said plurality of cell nuclei and a cell nucleus adjacent to the arbitrarily selected cell nucleus.

23. The non-transitory information storage medium storing the support program for histopathological diagnosis as set forth in claim 15,
wherein said support program for histopathological diagnosis causes a computer device to perform a differentiation process differentiating whether said ductal region is malignant or benign based on a measurement result of said uniformity of said plurality of cell nuclei.

24. The non-transitory information storage medium storing the support program for histopathological diagnosis as set forth in claim 16,
wherein said support program for histopathological diagnosis causes a computer device to perform a cell nucleus characteristic amount measurement process measuring said characteristic amount of said cell nucleus.

25. The non-transitory information storage medium storing the support program for histopathological diagnosis as set forth in claim 15,
wherein said support program for histopathological diagnosis causes a computer device to perform a ductal region detection process detecting said ductal region from said image.

26. The non-transitory information storage medium storing the support program for histopathological diagnosis as set forth in claim 15,
wherein said ductal region detection process detects a cell nucleus region from said image and said ductal region based on said cell nucleus region.

27. A non-transitory information storage medium storing a support program for histopathological diagnosis which is a computer program supporting the histopathological diagnosis by analyzing an image of a body tissue,
wherein the program causes a computer device to perform:
inputting said image;
analyzing said input image; and
outputting a uniformity of a plurality of cell nuclei included in a ductal region in said analyzed image.

28. The non-transitory information storage medium storing the support program for histopathological diagnosis as set forth in claim 27,
wherein said output process outputs whether said ductal region is malignant or benign.

29. A support method for histopathological diagnosis supporting the histopathological diagnosis by analyzing an image of a body tissue, the method comprising:
inputting said image; and
evaluating a cell nucleus uniformity by which a uniformity of a plurality of cell nuclei included in a ductal region in said input image is generated per duct.

30. The support method for histopathological diagnosis as set forth in claim 29, wherein said uniformity of said plurality of cell nuclei is found by using a characteristic amount of each cell nucleus included in said plurality of cell nuclei.

31. The support method for histopathological diagnosis as set forth in claim 30,
wherein said characteristic amount of said cell nucleus is found by using the size of said cell nucleus.

32. The support method for histopathological diagnosis as set forth in claim 30,
wherein said characteristic amount of said cell nucleus is found by using the form of said cell nucleus.

33. The support method for histopathological diagnosis as set forth in claim 30,
wherein said characteristic amount of said cell nucleus is found by using the polarity of said cell nucleus.

34. The support method for histopathological diagnosis as set forth in claim 30,
wherein said characteristic amount of said cell nucleus is found by using two or more of the size, form, and polarity of said cell nucleus.

35. The support method for histopathological diagnosis as set forth in claim 30,
wherein said uniformity of said plurality of cell nuclei is found by using the distribution of said characteristic amount of said cell nucleus in said plurality of cell nuclei included in said ductal region.

36. The support method for histopathological diagnosis as set forth in claim 30,
wherein said uniformity of said plurality of cell nuclei is found by using an amount of variation in a characteristic amount between a cell nucleus selected arbitrarily from said plurality of cell nuclei and a cell nucleus adjacent to the arbitrarily selected cell nucleus.

37. The support method for histopathological diagnosis as set forth in claim 29,
wherein said support method for histopathological diagnosis includes differentiating whether said ductal region is malignant or benign based on a measurement result of said uniformity of said plurality of cell nuclei.

38. The support method for histopathological diagnosis as set forth in claim 30,
wherein said support method for histopathological diagnosis includes measuring a cell nucleus characteristic amount by which said characteristic amount of said cell nucleus is measured.

39. The support method for histopathological diagnosis as set forth in claim 29,
wherein said support method for histopathological diagnosis includes detecting a ductal region by which said ductal region is detected from said image.

40. The support method for histopathological diagnosis as set forth in claim 29,
wherein said detecting a ductal region detects a cell nucleus region from said image and said ductal region based on said cell nucleus region.

41. A support method for histopathological diagnosis which is a method supporting the histopathological diagnosis by analyzing an image of a body tissue, the method comprising:
inputting said image;
analyzing said input image; and
outputting the a uniformity of a plurality of cell nuclei included in a ductal region in said analyzed image per duct.

42. The support method for histopathological diagnosis as set forth in claim 41,
wherein said outputting outputs whether said ductal region is malignant or benign.

43. The support system for histopathological diagnosis as set forth in claim 2,
wherein said characteristic amount of said cell nucleus is found by using the orientation of said cell nucleus.

44. The non-transitory information storage medium storing the support program for histopathological diagnosis as set forth in claim 16,
wherein said characteristic amount of said cell nucleus is found by using the orientation of said cell nucleus.

45. The support method for histopathological diagnosis as set forth in claim 30,
wherein said characteristic amount of said cell nucleus is found by using the orientation of said cell nucleus.

* * * * *

UNITED STATES PATENT AND TRADEMARK OFFICE
CERTIFICATE OF CORRECTION

PATENT NO. : 8,644,582 B2
APPLICATION NO. : 13/119678
DATED : February 4, 2014
INVENTOR(S) : Yoshiko Yoshihara, Kenji Okajima and Akira Saito Page 1 of 1

It is certified that error appears in the above-identified patent and that said Letters Patent is hereby corrected as shown below:

In the Claims

Column 16, Line 53: In Claim 27, after "image" insert -- per duct --

Signed and Sealed this
Eighteenth Day of November, 2014

Michelle K. Lee
*Deputy Director of the United States Patent and Trademark Office*